May 29, 1951      F. S. SCHRAGE      2,555,011
CAR TRUCK

Filed Nov. 26, 1945      3 Sheets-Sheet 1

INVENTOR.
Frederick S. Schrage
BY
Evans & McCoy
ATTORNEYS

May 29, 1951 F. S. SCHRAGE 2,555,011
CAR TRUCK
Filed Nov. 26, 1945 3 Sheets-Sheet 2
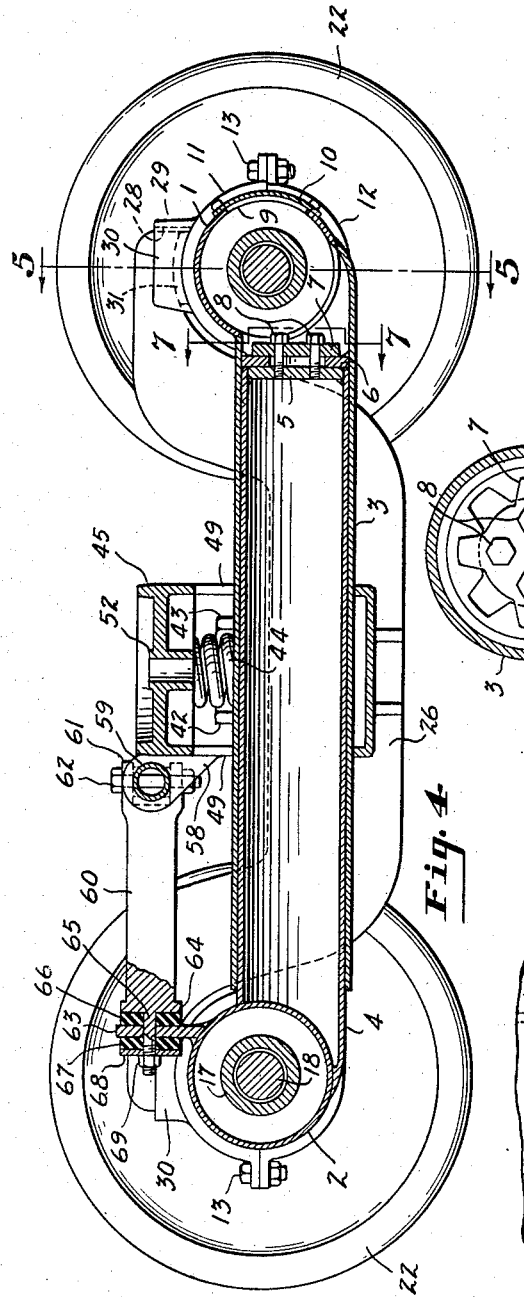
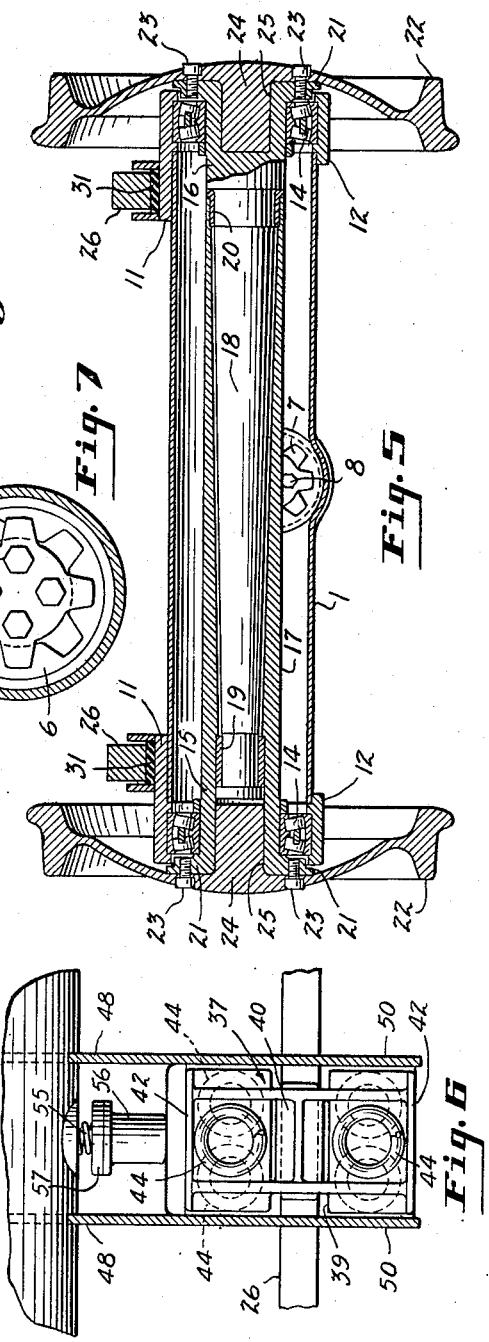
INVENTOR.
Frederick S. Schrage
BY
Evans + McCoy
ATTORNEYS May 29, 1951  F. S. SCHRAGE  2,555,011
CAR TRUCK
Filed Nov. 26, 1945  3 Sheets-Sheet 3
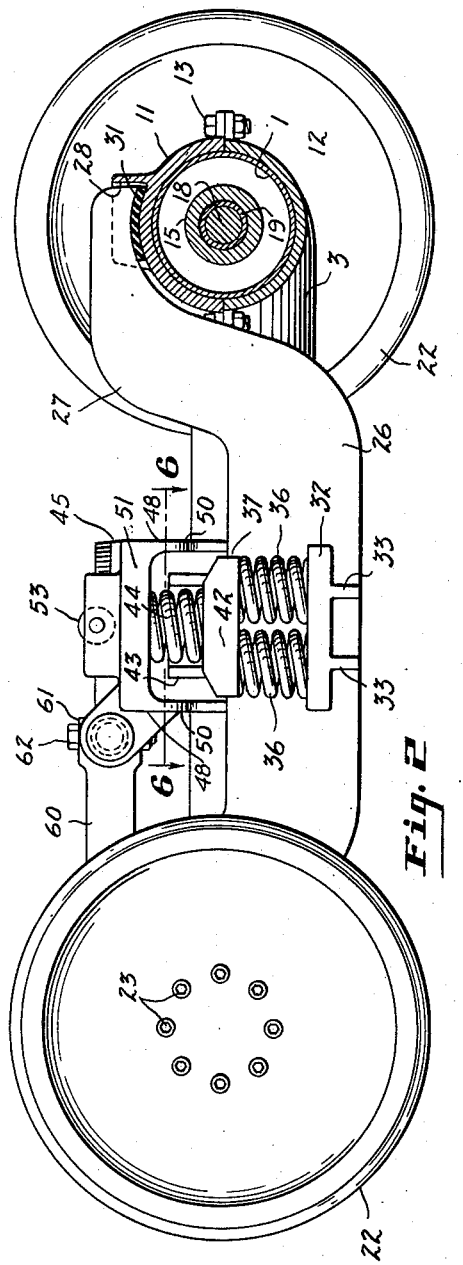
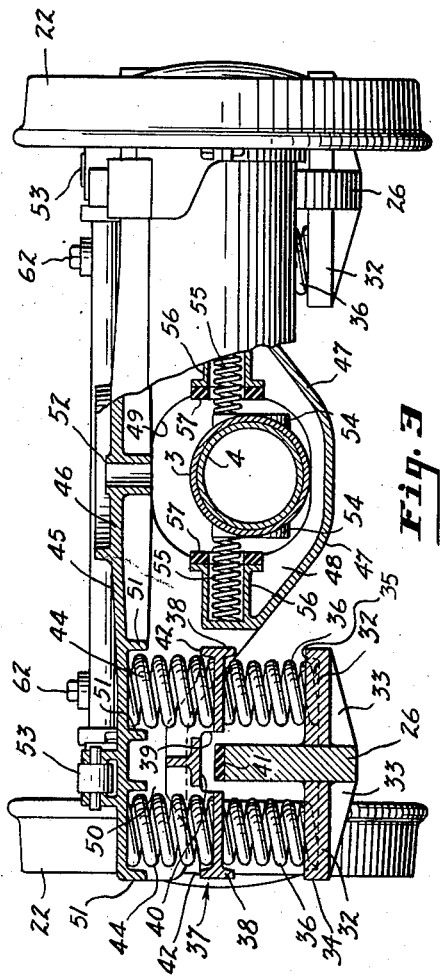
INVENTOR.
Frederick S. Schrage
BY
Evans + McCoy
ATTORNEYS Patented May 29, 1951

2,555,011

UNITED STATES PATENT OFFICE 2,555,011

CAR TRUCK

Frederick S. Schrage, Rock Island, Ill., assignor to The Bettendorf Company, Bettendorf, Iowa, a corporation of Maryland Application November 26, 1945, Serial No. 630,921

30 Claims. (Cl. 105—197)

1

This invention relates to railway car trucks and particularly to trucks suitable for carrying heavily loaded railway cars at high speeds.

Railway car trucks of the type in which the axles are journaled in side frames which are held in place by means of a central bolster or transom depend upon the bearings between the transom or bolster and the columns of the side frames and journal box bearings to hold the axles square with the side frames. Such bearings permit slight out of square movements when new and when worn permit such movements to an extent that causes objectionable wheel wear and rail climbing.

The present invention has for an object to provide a truck which is so constructed that only very limited out of square movements of the axles are permitted even after the bearings between relatively movable parts of the truck have been subjected to severe wear.

Trucks of the pedestal type provided with a rigid frame permit out of square movements of axles to a lesser extent than do the side frame type trucks but sliding of the axle bearing members in the vertical pedestal slots causes wear which eventually results in out of square movements of the axles. Furthermore, pedestal trucks are heavier and more expensive.

The present invention has for an object to provide not only a truck in which the axle is more rigidly held, but also to provide a truck of relatively light and inexpensive construction.

In both the side frame type truck and the pedestal type truck relatively little vertical flexibility is provided under full loads.

It is an important object of the present invention to provide a truck that has great vertical flexibility combined with light weight and simplicity of construction.

It is also an object of the invention to provide a truck that will be held together even though the truck becomes detached from the car body due to a train wreck.

An additional object of the invention is to provide a truck which is easily assembled or dismantled and which is so constructed that difficulties of inspection and maintenance are reduced.

Experimental trucks have been operated in which the axle attached wheels have been replaced with wheels capable of independent rotation in order to provide free wheeling to compensate for differences in sizes of wheels and for differences in the distances traveled by wheels in passing around curves. One serious difficulty

2 encountered in the use of free wheeling on car trucks is that there is much less tendency for the wheels to return the axles to square if they are once moved out of square than when both wheels turn with the axle. Another difficulty in the use of free wheeling is that unequal loads on the wheels while brakes are applied may cause slippage and unequal wear.

The present invention has for an object to provide a truck particularly suitable for free wheeling because the retention of the axles square with the frame is not dependent upon sliding bearings subject to wear and also because of the provision of means for maintaining a substantially uniform distribution of load to the independently rotating wheels.

With the above and other objects in view, the invention may be said to comprise the truck as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Fig. 2 is a side elevation of the truck with one wheel broken away to show the axle and its housing in vertical section;

Fig. 3 is a section taken on the line indicated at 3—3 in Fig. 1;

Fig. 4 is a section taken on the line indicated at 4—4 in Fig. 1, a portion of the anchoring rod which appears in side elevation being broken away to show its connection to the axle housing in section;

Fig. 5 is a vertical section taken on the line indicated at 5—5 in Fig. 4;

Fig. 6 is a section taken on the line indicated at 6—6 in Fig. 2, and

Fig. 7 is a section taken on the line indicated at 7—7 in Fig. 4.

Figure 1:
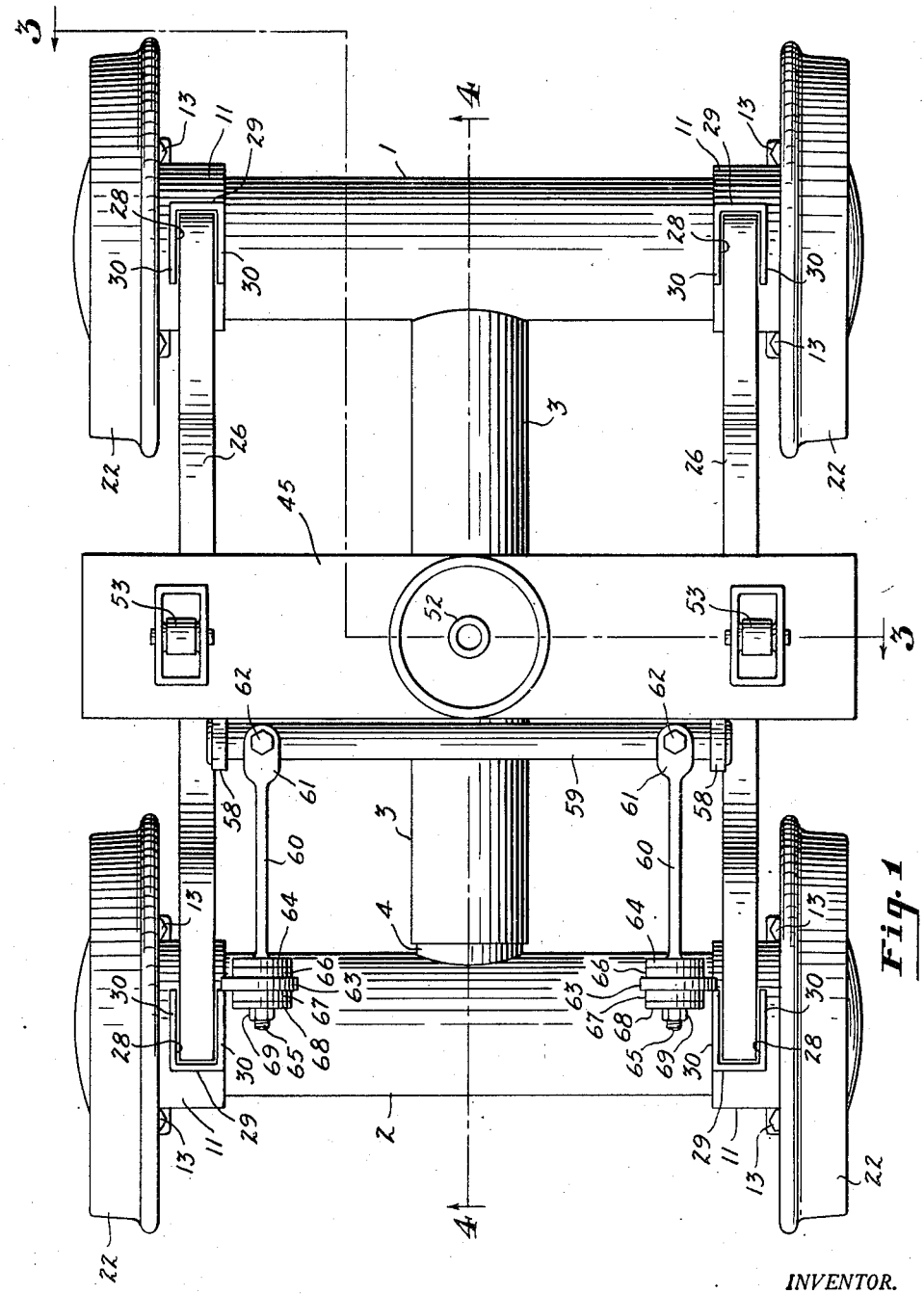
Figure 1 is a top plan view of a truck embodying the invention.

Referring to the accompanying drawings, the truck of the present invention has a main frame that is composed of two transverse axle or wheel carrying portions at the ends thereof which are preferably in the form of tubular housings 1 and 2 that are connected by a reach that is composed of telescopically connected tubes 3 and 4 that are held against relative longitudinal movementments but free to turn one relative to the other. The tube 3 is rigidly attached by suitable means such as welding to the housing 1 midway between the ends of the housing and extends at right angles to the housing. The tube 4 is rigidly attached at its end to the housing 2 in a manner similar to the tube 3 and is of a size to telescopically fit within the tube 3. The tubes 3 and 4 are of substantially the same length and are in telescopic engagement throughout substantially their entire length. Since the tubes 3 and 4 are cylindrical they provide an elongated pivot connecting the two axle housings 1 and 2 for pivotal movements in parallel planes about the axis of the tubes 3 and 4 which crosses the axes of the housings 1 and 2 centrally thereof and at right angles thereto.

Suitable means is provided for holding the tubes 3 and 4 against relative axial movements so as to hold the two axle housings at a fixed distance apart. As shown in Fig. 4, a closure disc 5 may be secured in the end of the tube 4 which lies adjacent the housing 1 and a stop ring 6 may be attached to the interior of the tube 3 adjacent the housing 1. The stop ring 6 is engaged by the end of the tube 4 and projects inwardly a sufficient distance to provide a stop surface for engagement with the peripheral portion of a disc 7 that is detachably connected by means of bolts 8 to the disc 5. Engagement of the tube 4 and the disc 7 with the stop rings 6 positively holds the tubes 3 and 4 against relative axial movements. If desired the ring 6 may have spaced recesses to receive correspondingly spaced peripheral projections of the plate 7 so as to permit separation of the tubes when one is turned through a predetermined angle with respect to the other. For convenience of assembly and to permit the frame to be readily dismantled, the axle housing 1 is provided with an opening 9 so that access may be had to the bolts 8 closed by a detachable cover 10.

The axle portions 1 and 2 of the frame provide wheel carriers that are restricted to movements in parallel planes perpendicular to a central longitudinal axis and it is to be understood that wheels may be mounted upon such axle portions in any suitable manner. As herein illustrated, however, the portions 1 and 2 are in the form of housings adapted to receive wheel carrying axles. The housings 1 and 2 each have a bearing collar 11 at each end having an upper half permanently attached to the housing and a lower half 12 that is detachably connected to the upper half by means of bolts 13. Suitable roller bearings 14 are mounted in the collars 11, the bearings at opposite ends of each housing being axially alined and adapted to receive a suitable wheel carrying axle.

The axle herein shown is of the free wheeling type shown in my copending application Serial No. 630,922, filed November 26, 1945, now abandoned, each axle consisting of two sections 15 and 16, the section 15 having a tubular body 17 that telescopically receives the inner end portion 18 of the section 16. Suitable bearings 19 and 20 are interposed between the telescoped portions of the axle sections 15 and 16 and serve to hold the two sections in axial alinement while permitting free rotation of one axle section with respect to the other. The wheel may be attached by any suitable means to the axle sections. In the axle herein shown the sections 15 and 16 are provided at their outer ends with identical flanges 21 to which wheels 22 are attached by suitable means such as bolts 23, each wheel having a hub 24 that fits in a receiving socket 25 formed in the axle sections to which the wheel is attached.

The telescopically connected tubes 3 and 4 provide a rigid reach connecting the central portions of the truck axles and because of the elongated bearing between the tubes 3 and 4 the axles are held against angular movements which would put them out of square. Furthermore, wear between the surfaces of the tubes 3 and 4 cannot result in any appreciable angular movements of the axles in a horizontal plane because of the great length of the bearing between the tubes 3 and 4.

The load equalizing bars 26 connect the outer ends of the truck axles to distribute the load substantially uniformly to the four wheels of the truck. The equalizing bars 26 have upwardly offset ends 27 which are seated in pockets 28 formed in the top of each of the bearing collars 11, each of the pockets 28 having an end wall 29 which restricts endwise movement of the equalizing bar and side walls 30 which restrict lateral movements of the bar. A cushioning pad 31 of rubber or rubber and fabric may be interposed between each of the ends of the equalizing bars and bottoms of the pockets 28. Midway between its ends each of the bars 26 has identical spring seating brackets 32 mounted on the inside and outsided thereof. The brackets 32 may be cast integral with the bars 26 or may be attached thereto by suitable means such as welding, and are suitably braced to carry the loads that are transmitted through them to the bars 26. As herein shown each of the brackets has bottom bracing webs 33 and an upper face that is recessed to form pockets for coil springs 36 which may be standard A. A. R. coil springs. A spring plate 37 is supported on the upper ends of the springs 36 and has a depending marginal flange 38 forming a pocket to receive the upper ends of the springs 36.

The load equalizing bars 26 have a height considerably greater than their thickness and the springs 36 do not extend any substantial distance past the upper edge of the bars 26. In order to allow the spring plate to have the necessary vertical movements it is provided with a central slot 39 to receive the bar 26 and with a raised central connecting portion 40 that is adapted to engage with the top edge of the bar 26 on excessive compression of the springs. If desired a suitable cushioning pad 41 may be mounted upon the top edge of each bar 26 to cushion the impact of the plate 37.

The spring plate 37 has upwardly extending flanges 42 at its inner and outer edges, which with front and rear flanges 43 form pockets for coil springs 44 which may also be of standard A. A. R. construction. The springs 44 support a bolster 45 that serves as an attaching member for connecting the car body to the truck. The raised central portion of the spring plate 37 may be engaged with the bolster 45 to prevent excessive compression of the springs 44, the central seating portion 40 of the spring plate being so disposed with respect to the load equalizing bar 26 and the under side of the bolster that the seat member 40 may be engaged with the bar 26 and with the bolster before the springs 36 and 44 are completely collapsed. The double spring arrangement provides a relatively wide range of vertical movement for the bolster and the stops prevent damage to the springs by abnormal impact shocks. The bolster 45 is of truss form having a top plate 46 that corresponds to the compression chord of a truss and a downwardly arched bottom plate 47 that corresponds to the tension chord of the truss, the top and bottom plates 46 and 47 being formed integrally with side plates 48. The bottom plates 47 terminate a sufficient distance inwardly from the ends of the bolster to accommodate the supporting springs 36 and 44, the side plates 48 being continued past the bottom plate 47 to form side flanges 50 at the ends of the bolster which provide pockets in the bolster for the upper ends of the springs 44, transverse flanges 51 being provided between the flanges 50 along the inner and outer sides of the springs 44.

The bolster has a central bearing portion 52 for pivotal connection to a car body and may be provided with bearing rollers 53 at opposite ends for engagement with bearing plates on the under side of the car body. Since the supporting spring units at opposite ends of the bolster 45 provide a considerable range of vertical movement, they also permit lateral endwise movements of the bolster and means is preferably provided for limiting the amplitude of lateral movements of the bolster. As shown in Fig. 3, blocks 54 may be attached to opposite sides of the outer reach tube 3 and coil springs 55 seated in horizontally disposed pockets 56 carried by the bolster engage the blocks 54. The inner ends of the pockets 56 may carry cushioning pads 57 of rubber or rubber and fabric which receive the impact of the blocks 54 and limit lateral movements of the bolster.

It is desirable that means be provided for restricting rocking of the bolster about a horizontal axis transverse thereto due to unequal loads imposed upon opposite ends of the bolster, and as herein shown such movements are restricted by means of connections to one of the axles. Brackets 58 are attached to one side of the bolster 45 adjacent the opposite ends thereof and provide bearings for a torque shaft 59 which may be in the form of a tube. Two anchoring rods 60 are provided with forked ends 61 which straddle the shaft 59 adjacent opposite ends thereof, the forked ends 61 being attached to the shaft 59 by means of pivot bolts 62 that extend diametrically through the shaft 59. The axle housing on the same side of the bolster as the shaft 59 is provided with brackets 63 to which the opposite ends of the anchoring rods 60 are attached. Each of the rods 60 has a flange 64 and a reduced threaded end portion 65 outwardly of the flange 64. A cushioning disc 66 is interposed between the flange 64 and the bracket 63. A cushioning disc 67 is received on the reduced end 65 and engages the opposite side of the bracket 63, the cushioning disc 67 being held in place by the washer 68 and nut 69 which serve to clamp the cushioning discs 66 and 67 against opposite sides of the bracket 63. The connection between the anchoring rods 60 and the brackets 63 permits limited endwise movement of the rods 60 and also slight angular movements of the rod in any direction.

The anchoring rods 60 tend to hold the bolster parallel to the axle to which it is connected by the rods 60 during its vertical movements. Whenever the downward thrust upon one end of the bolster is greater than upon the other, a portion of this thrust is transmitted through the torque shaft 59 to the opposite end of the bolster, thereby tending to equalize the load imposed upon the two load equalizing bars 26. The anchoring rods 60, which may be rectangular in cross section and of considerably greater height than thickness so as to effectually resist end thrusts and vertical bending stresses, serve to hold the bolster centrally of the truck as well as to equalize the loads imparted upon the bars 26 and through the bars 26 upon the four wheels of the truck.

During operation the vertical rocking movements of the end portions of the frame permit the wheels to have the necessary relative vertical movements but the axles are positively held square with the frame so that the independently rotating wheels are at all times properly engaged with the rails. Since the load on the individual wheels is equalized by the equalizer bars and by the anchoring connections between the bolster and one of the axles the independently rotating wheels will not be subject to unequal wear during application of brakes.

The elimination of vertically sliding bearings enables the springs to function more smoothly and the pivotal connections between the axles eliminates the tendency of the axles to get out of square.

It is to be understood that variations and modifications of the specific devices herein shown and described for purposes of illustration, may be made without departing from the spirit of the invention.

What I claim is:

1. A car truck comprising front and rear wheel carrying axles, a frame structure connecting said axles for relative swinging movements about a horizontal pivotal axis crossing the axes of said axles centrally and at right angles thereto, load equalizing bars extending parallel to said pivotal axis and rockably connected to said axles adjacent their ends, and car body attaching means intermediate said axles and yieldably supported by said equalizing bars.

2. A car truck comprising front and rear wheel carrying axles, a frame structure connecting said axles for relative swinging movements about a horizontal pivotal axis crossing the axes of said axles centrally and at right angles thereto, load equalizing bars extending parallel to said pivotal axis and rockably connected to said axles adjacent their ends, spring seats carried by said bars intermediate the axles, springs mounted on said seats, and a bolster supported by said springs.

3. A car truck comprising front and rear wheel carrying axles, a frame structure connecting said axles for relative swinging movements about a horizontal pivotal axis crossing the axes of said axles centrally and at right angles thereto, load equalizing bars extending parallel to said pivotal axis and rockably connected to said axles adjacent their ends, said bars having central portions downwardly offset with respect to the end portions thereof, a bolster having ends overlying said downwardly offset portions of the bars, and springs interposed between said bars and bolster.

4. A car truck comprising front and rear wheel carrying axles, means including a central longitudinally extending reach connecting said axles for relative swinging movements about a pivotal axis crossing the axes of the axles centrally and at right angles thereto, load equalizing bars on opposite sides of the reach and connecting corresponding ends of the axles, and a bolster yieldably supported at its ends upon said bars and having an opening through which said reach extends.

5. A car truck comprising front and rear wheel carrying axles, means including a central longitudinally extending reach connecting said axles for relative swinging movements about a pivotal axis crossing the axes of the axles centrally and at right angles thereto, load equalizing bars on opposite sides of the reach and connecting corresponding ends of the axles, a bolster having end portions overlying said bars and a central portion overlying the reach, vertically yieldable springs interposed between the bars and bolster, and horizontally yieldable springs interposed between the bolster and reach.

6. A car truck comprising front and rear wheel carrying axles, a frame structure connecting said axles for relative swinging movements about a horizontal pivotal axis crossing the axes of said axles centrally and at right angles thereto, load equalizing bars extending parallel to said pivotal axis and yieldably supported on said axles adjacent their ends, a bolster yieldably supported upon central portions of said equalizing bars, and anchoring members limiting movements of the bolster with respect to one of said axles.

7. A car truck comprising front and rear wheel carrying axles, a frame structure connecting said axles for relative swinging movements about a horizontal pivotal axis crossing the axes of said axles centrally and at right angles thereto, load equalizing bars extending parallel to said pivotal axis and connecting corresponding ends of said axles, a bolster yieldably supported by said equalizing bars, a shaft journaled in the bolster and extending longitudinally of the bolster, spaced anchoring rods attached at one end to said shaft and held against turning thereon, and means yieldably connecting the opposite ends of said arms to one of said axles.

8. A car truck comprising front and rear wheel carrying axles, means connecting said axles for relative swinging movements about a pivotal axis crossing the axes of said axles centrally and at right angles thereto, load equalizing bars extending parallel to said pivotal axis and connecting corresponding ends of said axles, a bolster midway between said axles and having ends overlying said equalizing bars, springs interposed between said bars and said bolster, and anchoring rods connecting said bolster to one of said axles to maintain substantial parallelism between the bolster and axle.

9. A car truck comprising front and rear wheel carrying axles, means including a central longitudinally extending reach connecting said axles for relative swinging movements about a pivotal axis crossing the axes of the axles centrally and at right angles thereto, load equalizing bars on opposite sides of the reach and connecting corresponding ends of the axles, a bolster yieldably supported at its ends upon said bars and having an opening through which said reach extends, vertically yieldable springs interposed between the bars and bolster, and springs interposed between opposite sides of said reach and said bolster for yieldably resisting endwise movements of the bolster.

10. A car truck comprising front and rear wheel carrying axles, a frame structure comprising a carrier for each axle having spaced alined bearings for its axle and means connecting central portions of said carriers for relative turning movements about a horizontal axis disposed at right angles to the axes of the axle bearings, equalizing bars rockably seated on said carriers adjacent their ends, and car body attaching means yieldably supported on said bars intermediate the axles.

11. A car truck comprising front and rear wheel carrying axles, a frame structure comprising a carrier for each axle having spaced alined bearings for its axle and means connecting central portions of said carriers for relative turning movements about a horizontal axis disposed at right angles to the axes of the axle bearings, equalizing bars rockably seated on said carriers adjacent their ends, a bolster having its ends overlying central portions of said equalizing bars, and springs interposed between said bars and bolster.

12. A car truck comprising front and rear wheel carrying axles, a frame structure comprising a carrier for each axle having spaced alined bearings for its axle and a reach connecting central portions of said carriers, means connecting the carriers to the reach for relative turning movements about a horizontal axis at right angles to the axes of the alined axle bearings, equalizing bars yieldably supported on said carriers adjacent their ends, and a bolster yieldably supported on said bars intermediate the axles.

13. A car truck comprising front and rear wheel carrying axles, a T-shaped member having an axle receiving portion having axially alined bearings for one of said axles and a stem rigidly connected to said axle receiving portion centrally thereof and extending at right angles to the axis of said bearings, a second member having axially alined bearings for the other of said axles and connected centrally to said stem to swing about an axis at right angles to the axes of its bearings, equalizing bars connecting corresponding ends of said axle receiving portions and a bolster yieldably supported on said bars.

14. A car truck comprising front and rear transverse axles, axially alined independently rotatable wheels on each axle, a frame structure connecting said axles to swing in parallel planes about a longitudinal axis normal to said planes and crossing the axles centrally thereof, longitudinal load equalizing bars, each yieldably supported upon corresponding ends of said axles, and car body attaching means yieldably supported on said bars intermediate the axles.

15. A car truck comprising front and rear transverse axles, axially alined independently rotatable wheels on each axle, a frame structure connecting said axles to swing in parallel planes about a longitudinal axis normal to said planes and crossing the axles centrally thereof, longitudinal load equalizing bars, each yieldably supported at its ends upon corresponding end portions of said axles, a transverse bolster intermediate the axles and overlying said bars, and supporting springs interposed between said bars and bolster.

16. A car truck comprising front and rear transverse axles, axially alined independently rotatable wheels on each axle, a frame structure connecting said axles to swing in parallel planes about a longitudinal axis normal to said planes and crossing the axles centrally thereof, longitudinal load equalizing bars, each yieldably supported at its ends upon corresponding end portions of said axles, a transverse bolster intermediate the axles and overlying said bars, supporting springs interposed between said bars and bolster, and means for holding said bolster substantially parallel to said planes.

17. A car truck comprising front and rear transverse axles, axially alined independently rotatable wheels on each axle, a frame structure connecting said axles to swing in parallel planes about a longitudinal axis normal to said planes and crossing the axles centrally thereof, longitudinal load equalizing bars, each yieldably supported at its ends upon corresponding end portions of said axles, a transverse bolster intermediate the axles and overlying said bars, supporting springs interposed between said bars and bolster, and means for yieldably resisting endwise movements of the bolster.

18. A car truck comprising front and rear transverse axles, axially alined independently rotatable wheels on each axle, axle carrying members, means connecting said members comprising an elongated longitudinal pivot whose axis crosses the front and rear wheel axes centrally thereof, means for holding said members against relative longitudinal movements, a transverse bolster intermediate the axles, and bolster supporting members connecting end portions of said axle carrying members for distributing loads imposed upon said bolster to said axles.

19. A car truck comprising front and rear axles, housings for said axles, a tube attached rigidly to each housing centrally thereof and disposed at right angles thereto, said tubes being telescopically connected and relatively rotatable, means for holding said tubes against relative endwise movements, a transverse bolster, intermediate the axles and bolster supporting members connecting end portions of said housings for distributing loads imposed upon the bolster to said housings.

20. A car truck comprising front and rear axles, housings for said axles, a tube attached rigidly to each housing centrally thereof and disposed at right angles thereto, said tubes fitting one within the other in telescopic engagement substantially throughout the space between said housings to provide an elongated longitudinal pivot connecting said housings, means for holding said tubes against relative endwise movements, a transverse bolster intermediate the axles, and bolster supporting members connecting end portions of said housings for distributing loads imposed upon the bolster to said housings.

21. A car truck comprising front and rear axles, housings for said axles, a tube attached rigidly to each housing centrally thereof and disposed at right angles thereto, said tubes being telescopically connected and relatively rotatable, means for holding said tubes against relative endwise movements, a pocket at each end of each housing at the top thereof, load equalizing bars on opposite sides of said telescoped tubes, each bar having ends seated in said pockets, a bolster midway between said housings and overlying said bars, and supporting springs interposed between said bars and said bolster.

22. A car truck comprising front and rear axles, housings for said axles, a tube attached rigidly to each housing centrally thereof and disposed at right angles thereto, said tubes being telescopically connected and relatively rotatable, means for holding said tubes against relative endwise movements, a pocket at each end of each housing at the top thereof, load equalizing bars on opposite sides of said telescoped tubes, each bar having ends seated in said pockets, a bolster midway between said housings and overlying said bars, supporting springs interposed between said bars and said bolster, and anchoring rods connecting the opposite end portions of the bolster to opposite end portions of one of said housings.

23. A car truck comprising front and rear axles, a bolster, longitudinal equalizing bars extending beneath opposite ends of the bolster, spring seats mounted upon the outer and inner sides of each bar, coil springs mounted on said seats, a spring plate mounted upon the springs carried by each bar and extending across the top of the bar, each spring plate having a central portion overlying its bar and springs seated on opposite sides of said central portion, said central portion of each spring plate being engageable with the top of an equalizing bar upon compression of said springs, and springs interposed between the seats of said spring plates and said bolster.

24. A car truck comprising front and rear axles, a bolster, longitudinal equalizing bars extending beneath opposite ends of the bolster, spring seats mounted upon the outer and inner sides of each bar, coil springs mounted on said seats, a spring plate mounted upon the springs carried by each bar and extending across the top of the bar, each spring plate having a central portion overlying its bar and springs seated on opposite sides of said central portion, said central portion of each spring plate being engageable with the top of an equalizing bar upon compression of said springs, a cushioning pad on each of said bars beneath said plate, and springs interposed between the seats of said spring plate and the bolster.

25. A car truck comprising front and rear axles, a bolster, longitudinal equalizing bars extending beneath opposite ends of the bolster, spring seats mounted upon the outer and inner sides of each bar, coil springs mounted on said seats, a spring plate mounted upon the springs carried by each bar and extending across the top of the bar, each spring plate having a central portion overlying its bar and springs seated on opposite sides of said central portion, said central portion of each spring plate being engageable with the top of an equalizing bar upon compression of said springs, and springs interposed between the seats of said spring plates and said bolster, said plate having an upwardly projecting portion between its seats engageable with the bolster to limit compression of the upper springs.

26. A car truck comprising front and rear axles, a tubular housing for each axle, means connecting said housings for independent swinging movements in parallel planes about an axis at right angles to the axes of the housings and crossing said axes midway between the ends of the housings, two longitudinal equalizing bars, each supported at its ends on corresponding ends of said housings, a bolster midway between said housings and overlying said bars, supporting springs interposed between said bars and said bolster, a horizontal shaft rotatably mounted on one side of said bolster, brackets attached to the top of one of said housings adjacent the ends, a rod pivoted at one end to said shaft adjacent each end thereof to swing about an axis transverse to the shaft axis, each of said rods being attached to one of said brackets, and yielding means interposed between each rod and its bracket to limit movements of the rod with respect to the bracket.

27. A car truck comprising front and rear axles, a tubular housing for each axle, means connecting said housings for independent swinging movements in parallel planes about an axis at right angles to the axes of the housings and crossing said axes midway between the ends of the housings, two longitudinal equalizing bars, each supported at its ends on corresponding ends of said housings, a bolster midway between said housings and overlying said bars, supporting springs interposed between said bars and said bolster, a horizontal shaft rotatably mounted on one side of said bolster, brackets attached to the top of one of said housings adjacent the ends, each bracket comprising an upright plate parallel to the axis of the housing and provided with an opening, two rods each having an end extending through the opening of one bracket, each rod having a fork at the opposite end that straddles said shaft, vertical pivots connecting said forks to said shaft, cushioning pads on said rods engaging opposite faces of the brackets, and means carried by said rods for clamping said pads to said bracket.

28. A railway truck comprising two tubular axle housings, a reach composed of two relatively rotatable telescopically interfitting tubes, each rigidly attached at one end to one of said housings centrally thereof and disposed at right angles thereto, and interengaging bearing members carried by the tubes for holding said tubes against relative axial movements.

29. A railway truck comprising two tubular axle housings, a reach composed of two relatively rotatable telescopically interfitting tubes, each rigidly attached at one end to one of said housings centrally thereof and disposed at right angles thereto, said tubes being in telescopic engagement substantially throughout their length, and interengaging bearing members carried by the tubes for holding said tubes against relative axial movements.

30. A railway truck comprising two tubular axle housings, a reach composed of two relatively rotatable telescopically interfitting tubes, each rigidly attached at one end to said housing centrally thereof and disposed at right angles thereto, said tubes being in telescopic engagement substantially throughout their length, a retaining ring attached to the interior of the outer of said tubes adjacent its attached end, a retaining disc detachably connected to the inner tube and engaging said ring to hold said tubes against relative endwise movements, and an opening in the housing affording access to said retaining disc.

FREDERICK S. SCHRAGE.

REFERENCES CITED

The following references are of record in the file of this patent:

UNITED STATES PATENTS

| Number | Name | Date |
|---|---|---|
| 243,798 | Robinson | July 5, 1881 |
| 339,041 | Brill | Mar. 30, 1886 |
| 357,612 | Lewis | Feb. 15, 1887 |
| 413,505 | Gilbert | Oct. 22, 1889 |
| 544,417 | Pyott | Aug. 13, 1895 |
| 682,348 | Ambler | Sept. 10, 1901 |
| 1,619,572 | Gray | Mar. 1, 1927 |
| 1,657,777 | Blunt | Jan. 31, 1928 |
| 1,840,988 | Traver | Jan. 12, 1932 |
| 2,312,377 | Bauer | Mar. 2, 1943 |
| 2,316,046 | Buckwalter | Apr. 6, 1943 |

FOREIGN PATENTS

| Number | Country | Date |
|---|---|---|
| 299,577 | Great Britain | Nov. 1, 1928 |